UNITED STATES PATENT OFFICE.

CHARLES BLANC, OF AKRON, OHIO, ASSIGNOR TO THE GOODYEAR TIRE AND RUBBER COMPANY, OF AKRON, OHIO, A CORPORATION OF OHIO.

PROCESS FOR THE PREPARATION OF CHLOR-SUBSTITUTION PRODUCTS OF THE SATURATED PARAFFIN HYDROCARBONS.

1,248,065.   Specification of Letters Patent.   Patented Nov. 27, 1917.

Application filed May 1, 1914. Serial No. 835,620.

*To all whom it may concern:*

Be it known that I, CHARLES BLANC, Ph. D., chemist, subject of Nicholas II, Emperor of Russia, residing at Akron, in the county of Summit and State of Ohio, have invented new and useful Improvements in Processes for the Preparation of Chlor-Substitution Products of the Saturated Paraffin Hydrocarbons, of which the following is a specification.

This invention relates to the production and manufacture, by direct chlorination, of any specific individual chlorin derivative of a hydrocarbon of the paraffin, or methane series; the hydrocarbon of the paraffin or methane series referred to having the general formula $C_nH_{2n_2}$, may be obtained from or as mineral or petroleum oils, or may be procured from any other source and by any means whatsoever.

Experience has shown that previous experiments in direct chlorination of the above-mentioned paraffin hydrocarbons have resulted in the production only of various mixtures of mono-, di-, tri, and higher chlorin substitution products, the separation of which is practically impossible and the proportions of each in the mixture being uncontrollable.

Beilstein (*Handbuch der Organischen Chemie* 1893, volume 1, page 142) states for example, that in the production of the mono-chlor-derivatives of paraffin hydrocarbons by direct chlorination, it is impossible to prevent the chlorination proceeding too far, and the desirable mono-chlorids can only be obtained by a troublesome fractionation.

Meyer and Jacobson (*Handbuch der Organischen Chemie* 1907, vol. 1, page 269) state: "Finally of theoretical interest is the formation of the chlorids and bromids of the paraffin hydrocarbons by direct substitution. This formation-reaction cannot be used as a method of preparation because the chlorination or bromination does not give a pure product. When the reaction takes place in liquid state, the substitution easily proceeds beyond the monochlorid or monobromid to higher chlorids or bromids."

I have discovered that, by the use of some reaction favoring agents, as any chemically active light and halogen-carrier, employed simultaneously with some reaction controlling means, as cooling, the reaction product being at the same time so removed as to preclude the possibility of excessive and undesirable chlorination, I am able to produce, at will, any specific individual chlorinated paraffin hydrocarbon, such for example as mono-, or di-, or tri-, or tetra-, or any higher chlorin-substitution product of the employed paraffin hydrocarbon, such desired specific individual chlorinated paraffin hydrocarbon being substantially pure and free from other undesirable, more or less chlorinated products. Moreover, I am able to conduct this direct chlorination without the necessity of any preliminary change in the state of aggregation of the reacting hydrocarbon; I am also able to conduct this chlorination upon the reacting hydrocarbon dissolved in some inert non-reacting solvent, such for example, as carbon-tetrachlorid.

The means which I employ to control and modify the course of the chlorination in order to secure any specific desired chlorinated paraffin hydrocarbon are as follows:

Directly into a mass of the employed paraffin hydrocarbon, contained in some suitable reaction chamber, is conducted a stream of chlorin, in some measure regulated to conform with the quantity of the hydrocarbon; to facilitate the reaction, particularly in the chlorination of the higher paraffin hydrocarbons, it is advisable to add to the hydrocarbons some halogen-carrier. It is essential to my process that the reaction chamber be provided with some means for effectively cooling its contents, and simultaneously exposing said contents to the daylight, or sunlight, or any chemically active artificial light.

The contents of the reaction chamber are removed, either continuously or intermittently, and any unchanged paraffin hydrocarbon or any undesirable lower-chlorinated derivatives of the employed paraffin hydrocarbon, separated from the desired chlorin-derivative of the employed paraffin hydrocarbon by distilling, said unchanged paraffin hydrocarbon or undesirable lower-chlorinated derivatives of the employed paraffin hydrocarbon being returned in any suitable manner to the reaction chamber where they are again submitted to the action of chlorin. The desired chlorinated paraffin hydrocarbon is removed from the still, washed with some aqueous alkaline solution, separated from the washing solution, and finally, if desired, dried and distilled.

To carry out my improved process and control and modify the course of chlorination in order to secure any specific desired chlorinated paraffin hydrocarbon, I make use of certain mechanical instrumentalities, a preferred form of which is shown in the accompanying drawing in which the same is illustrated diagrammatically, to which reference is hereby made.

It is to be understood that any changes, variations and modifications can be resorted to in connection with this process, which come within the scope of the matter hereinafter claimed.

In the drawing, the reference numeral 1 denotes a double tank or container constituting a reaction chamber, between the walls of which is provided a space 2 in which is placed some cooling agent such for instance as cracked ice 3. In the side walls 4 of the member 1 are preferably placed some material transparent to the kind of light employed, such for instance, as glass or quartz, through which light, either natural or artificial, may enter to subject the contents of the tank to the action and influence thereof. This light, as before mentioned, may consist of day light or any artificial light generated through the medium of electric lights 5 suitably placed for that purpose. The tank 1 is provided with an inlet pipe 6 provided with a cock 7 the opposite end of which is connected with a flask 8 containing a volume of water into which depends the discharge end of a pipe 9 connected with a tank 10 containing chlorin. By this arrangement, the chlorin in the tank 10 passes into the flask 8 below the surface of the water and the chlorin bubbling up through the water attaches to itself a certain volume thereof, for I have found that the presence of moisture even in minute amounts is favorable to the conduct of the chlorination; the moist chlorin passes upwardly through the pipe 6, and discharges into the tank 1 which constitutes the reaction chamber. The tank 1 is further provided with an inlet pipe 11 provided with a cock 12 and also provided near its upper end with a chamber 13 into which leads an inlet pipe 14 controlled by a cock 15 above which is a filling funnel 16. The chamber 1 is further provided with a connecting pipe 17 in which is a cock 18, and above the cock 18 is a series of coils 19 and 20 both of which are surrounded by chambers 21 and 22 in which is placed cracked ice for a purpose to be later described. The upper end of the pipe 17, after passing through the condensing chambers 21 and 22, terminates near the lower portion of a flask 23 in which is placed a volume of water 24. Extending from the upper portion of the flask 23 to near the bottom of a similar flask 25 is a pipe 26 in which is a cock 27. In the flask 25 is placed a volume of alkaline solution, such as calcium or sodium hydroxid. Extending from the upper portion of the flask 25 and terminating near the bottom of a flask 28 is a pipe 29 having a cock 30. The flask 28 is partially filled with a volume of naphtha 31. From the upper portion of the flask 28 leads a pipe 32 provided with a cock 33.

The reaction chamber is provided with an outlet 34 connecting near the lower portion thereof, the lower end of which terminates in a still 35. This pipe 34 is provided with a cock 36 and a drainage outlet 37 having a cock 38. Surrounding the still 35 and spaced therefrom, is a chamber 39 to receive a temperature-controlling medium 40, supplied through the medium of a pipe 41 provided with a cock 42. The still 35 is provided with a drain 43 having a controlling cock 44. In order to ascertain the temperature of the medium 40 surrounding the still 35 a thermometer 45 is provided. Extending upwardly from and having communication with the still 35 is a pipe 46—46', between the termini of which is a chamber 47 surrounded by a casing 48 providing a spherical space for a purpose to be later described. The upper portion of the pipe 46' is downwardly-bent at 49 and from thence is provided with a spirally-coiled portion 50 from which depends a pipe 51 terminating in the reaction chamber 1. This pipe 51 is provided with a cock 52. Surrounding the coiled portion 50 of the pipe 46 is a chamber 53 provided with an outlet 54 and an inlet 55. Connecting with the spherical space within the casing 48 is a T-tube 56 in which is mounted a thermometer 57, and this tube is provided at its lower end with a drainage pipe 58 provided with a cock 59. In open communication with the spherical space inclosed by the member 48 through the medium of a pipe 60, is a tank 61 provided near its lower end with an inlet 62. Extending in the tank 61 is a pipe 63 provided with an outlet 64 having a cock 65. This pipe 63 is provided in a tank 61 with a plurality of spherically-formed enlargements 66 and at its lower end with an inlet 67 having a cock 68.

Through #67 may be passed steam, hot water, cold water, or any other temperature controlling material; the object of this section of the apparatus is to maintain such a temperature in #47 that fractional condensation shall take place; the desired chlorination product will condense and return to container #35 while the incompletely chlorinated compounds, being lighter boiling, will pass on through tube #46, being condensed in #50 and returned to #1 for further chlorination.

An example of my improved process, utilizing the instrumentalities just described, is somewhat as follows:

In the following I give a description of the process as applied to a liquid paraffin hydrocarbon, namely, the preparation of mono-chlor-pentane from pentane.

5 gallons of pentane are introduced into a Woulff bottle of 8 gallons capacity by means of a funnel. Through another upper opening in the Woulff bottle, a stream of chlorin is introduced directly into the pentane. The Woulff bottle rests in an ice bath, which maintains the temperature of the interior of the Woulff bottle at about 10° C. Cooling serves first to modify the reaction by keeping down the temperature caused by heat liberated during the chlorination, and second to retain the pentane in liquid form. The Woulff bottle with its contents, immersed in an ice bath, is exposed to the light of tungsten lamps.

In place of Woulff bottle for a reaction chamber I may use a chamber of any resistant material; this chamber being provided with windows of glass, quartz or any other material which will satisfactorily transmit the stimulating chemically active rays of light.

In my experimenting I have found that, in the place of light from the tungsten lamp, daylight, sunlight, gas light, light from the electric arc, the mercury vapor lamp, etc., may be successfully employed.

In order to further encourage the reaction, I add to the hydrocarbon, a halogen-carrier, for example, an aqueous solution of chlorid of iron; however, the addition of the halogen-carrier is not always necessary in the case of the chlorination of the lower members of the paraffin hydrocarbon series. Furthermore, the chlorin bubbles through a water column before it enters the reaction chamber because I have found that the presence of moisture, even in minute amounts, is favorable to the conduct of the chlorination; also, this bubbling of chlorin through water enables me to observe and regulate the amount of chlorin entering the reaction chamber.

After a few minutes the reaction begins; this is indicated by the disappearance of the yellow color given to the reaction mixture by the trifling amount of chlorin dissolved; thereafter, because of the fact that the added chlorin is immediately reactive under the described conditions, the reaction mixture remains colorless.

The reaction mixture is withdrawn from the reaction chamber into the still; the temperature of the still content is, in the case of pentane, maintained at about 70° C. At this temperature the unchanged pentane, mixed with some of the desired mono-chlor-pentane is vaporized and passes through the jacketed tube which is kept at a temperature of about 40° C., being a few degrees above the boiling point of the pentane, where further separation takes place, the condensed mono-chlorid trickling back into the still, and the unchanged pentane returning through a condenser, to the reaction chamber for chlorination. A constant level of reaction mixture is maintained in the reaction chamber by the continuous or intermittent addition of fresh pentane.

From this foregoing description it is evident that my process may be either entirely continuous or intermittent, at will. The mono-chlor-pentane accumulating in the still may be withdrawn as desired, washed with aqueous solution of sodium carbonate, and if necessary, dried and distilled.

The hydrochloric acid gas evolved during the reaction passes off through a system of upright condensers, and thence through a series of washing flasks, filled respectively with water, alkaline solution, as calcium or sodium hydroxid, and naphtha. In the washing flask filled with water, I collect hydrochloric acid in a marketable form; in the flask filled with alkaline solution, the last traces of hydrochloric acid are removed; in the flask filled with naphtha, any pentane, mechanically carried over, is recovered.

The process, conducted as in the herein described example, ultimately converts all the employed pentane into pure mono-chlor-pentane. In order to produce dichlor-pentane, the rate of passage of the reaction mixture through the apparatus is somewhat reduced over that suitable for the production of mono-chlor-pentane; the temperature of the still contents is maintained at about 115° C. being a temperature between the boiling point of dichlor-pentane and the boiling point of the next lower chlor-pentane, namely, mono-chlor-pentane; the jacketed tube is maintained at 108° C., being a few degrees above the boiling point of the mono-chlor-pentane.

In order to produce tri-, or tetra-, or any other desired higher chlorinated pentane, suitable temperature adjustments, and suitable control of rate of passage of the reaction mixture are necessary.

I use the term "liquid paraffin-hydrocarbon material" to include not only the liquid paraffin-hydrocarbon itself, but also any liquid chlor-substitution product thereof which is in a lower stage of chlorination than the chlor-substitution product desired, each with or without a solvent therefor.

It is also obvious that when I obtain liquid paraffin-hydrocarbon material during the fractioning of the reaction products, such recovered material may or may not be reintroduced into the process without in anywise altering this, my invention.

I claim:—

1. A process for producing a predetermined chlor-substitution product of a liquid paraffin-hydrocarbon, which consists in subjecting liquid paraffin-hydrocarbon material to the action of chlorin, actinic light, and a temperature-regulating agent.

2. A process for producing a predetermined chlor-substitution product of a liquid paraffin-hydrocarbon, which comprises subjecting the hereinbefore defined liquid paraffin-hydrocarbon material to the simultaneous action of chlorin, actinic light and a temperature-regulating agent.

3. A process for producing a predetermined chlor-substitution product of a liquid paraffin-hydrocarbon, which comprises, subjecting the hereinbefore defined liquid paraffin-hydrocarbon material to the simultaneous action of chlorin, actinic light, a temperature-regulating agent and a chlorin carrier.

4. A process for producing a predetermined chlor-substitution product of a liquid paraffin-hydrocarbon, which comprises, subjecting the hereinbefore defined liquid paraffin-hydrocarbon material to the simultaneous action of chlorin, actinic light and a temperature-regulating agent, removing the desired chlor-substitution product, and adding a fresh supply of chlorin and the hereinbefore defined liquid paraffin-hydrocarbon material to that material from which the chlor-substitution product was separated.

In testimony whereof I have hereunto set my hand in presence of two subscribing witnesses.

CHARLES BLANC.

Witnesses:
C. E. HUMPHREY,
A. L. McCLINTOCK.